United States Patent
Lee

(10) Patent No.: US 11,138,963 B2
(45) Date of Patent: Oct. 5, 2021

(54) METHOD AND APPARATUS WITH TEXT-TO-SPEECH CONVERSION

(71) Applicant: SAMSUNG ELECTRONICS CO., LTD., Suwon-si (KR)

(72) Inventor: Hoshik Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 16/404,886

(22) Filed: May 7, 2019

(65) Prior Publication Data
US 2020/0211528 A1  Jul. 2, 2020

(30) Foreign Application Priority Data

Dec. 27, 2018 (KR) .................. 10-2018-0170386

(51) Int. Cl.
| | |
|---|---|
| *G10L 13/02* | (2013.01) |
| *G10L 25/69* | (2013.01) |
| *G06N 3/08* | (2006.01) |
| *G10L 15/16* | (2006.01) |
| *G06N 3/04* | (2006.01) |
| *G10L 15/06* | (2013.01) |

(52) U.S. Cl.
CPC ............ *G10L 13/02* (2013.01); *G06N 3/0454* (2013.01); *G06N 3/088* (2013.01); *G10L 15/063* (2013.01); *G10L 15/16* (2013.01); *G10L 25/69* (2013.01)

(58) Field of Classification Search
None
See application file for complete search history.

(56) References Cited

U.S. PATENT DOCUMENTS

| | | | |
|---|---|---|---|
| 2015/0161983 A1* | 6/2015 | Yassa | G10L 15/065 704/260 |
| 2016/0171974 A1 | 6/2016 | Hannun et al. | |
| 2018/0268806 A1* | 9/2018 | Chun | G10L 19/00 |

FOREIGN PATENT DOCUMENTS

| | | |
|---|---|---|
| CN | 107180628 A | 9/2017 |
| JP | 9-152884 A | 6/1997 |
| JP | 2017-134396 A | 8/2017 |
| KR | 10-2018-0028893 A | 3/2018 |

OTHER PUBLICATIONS

Jia Y, Zhang Y, Weiss RJ, Wang Q, Shen J, Ren F, Chen Z, Nguyen P, Pang R, Moreno IL, Wu Y. Transfer learning from speaker verification to multispeaker text-to-speech synthesis. arXiv preprint arXiv: 1806.04558. Jun. 12, 2018. (Year: 2018).*

(Continued)

*Primary Examiner* — Paras D Shah
*Assistant Examiner* — Athar N Pasha
(74) *Attorney, Agent, or Firm* — NSIP Law

(57) ABSTRACT

A processor-implemented text-to-speech method includes determining, using a sub-encoder, a first feature vector indicating an utterance characteristic of a speaker from feature vectors of a plurality of frames extracted from a partial section of a first speech signal of the speaker, and determining, using an autoregressive decoder, into which the first feature vector is input as an initial value, from context information of the text, a second feature vector of a second speech signal in which a text is uttered according to the utterance characteristic.

22 Claims, 11 Drawing Sheets

(56) References Cited

OTHER PUBLICATIONS

Yasuda Y, Wang X, Takaki S, Yamagishi J. Investigation of enhanced Tacotron text-to-speech synthesis systems with self-attention for pitch accent language. arXiv preprint arXiv:1810.11960. Oct. 29, 2018. (Year: 2018).*

Wang J, Zhao X, Xie X, Kuang J. A multi-frame PCA-based stereo audio coding method. Applied Sciences. Jun. 2018;8(6):967. (Year: 2018).*

Wang Y, Skerry-Ryan RJ, Stanton D, Wu Y, Weiss RJ, Jaitly N, Yang Z, Xiao Y, Chen Z, Bengio S, Le Q. Tacotron: Towards end-to-end speech synthesis. arXiv preprint arXiv:1703.10135. Mar. 29, 2017. (Year: 2017).*

Lee Y, Kim T, Lee SY. Voice Imitating Text-to-Speech Neural Networks. arXiv. org Computer Science: Sound. (Year: 2018).*

Yang et al., Statistical parametric speech synthesis using generative adversarial networks under a multi-task learning framework. In2017 IEEE Automatic Speech Recognition and Understanding Workshop (ASRU) Dec. 16, 2017 (pp. 685-691). IEEE. (Year: 2017).*

Gibiansky, Andrew, et al. "Deep Voice 2: Multi-Speaker Neural Text-To-Speech." *Advances in Neural Information Processing Systems*. 2017.

* cited by examiner

1100

METHOD AND APPARATUS WITH TEXT-TO-SPEECH CONVERSION

CROSS-REFERENCE TO RELATED APPLICATIONS

This application claims the benefit under 35 USC 119(a) of Korean Patent Application No. 10-2018-0170386 filed on Dec. 27, 2018 in the Korean Intellectual Property Office, the entire disclosure of which is incorporated herein by reference for all purposes.

BACKGROUND

1. Field

The following description relates to a method and apparatus with text-to-speech conversion.

2. Description of Related Art

It is known that end-to-end speech recognition models require a large amount of training data compared to existing hybrid models. To obtain such enormous amounts of training data, various methods are used to increase available quantities of feature vectors, and there have been attempts to use training speech signals for training by generating the training speech signals from text-only data, rather than speech-text pair training data, using text-to-speech (TTS), which takes text-only data and produces corresponding speech signals.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented text-to-speech method includes determining, using a sub-encoder, a first feature vector indicating an utterance characteristic of a speaker from feature vectors of a plurality of frames extracted from a partial section of a first speech signal of the speaker, and determining, using an autoregressive decoder, into which the first feature vector is input as an initial value, from context information of the text, a second feature vector of a second speech signal in which a text is uttered according to the utterance characteristic.

The determining of the first feature vector may include determining the first feature vector from feature vectors of a plurality of frames extracted from a section of the first speech signal in which speech of the speaker exists.

The determining of the first feature vector may include determining the first feature vector from feature vectors of a plurality of frames extracted at random from a section of the first speech signal after a midpoint of the first speech signal.

The determining of the first feature vector may include determining the first feature vector by transforming a dimension of the feature vectors of the plurality of frames extracted from the section of the first speech signal.

The first feature vector may be input as an autoregressive initial value of an embedding layer included in the autoregressive decoder.

The first feature vector may be input as an initial value of the embedding layer, and an output value of a previous operation of the embedding layer may be input again into the embedding layer.

A recurrent initial value of a hidden layer included in the autoregressive decoder may be 0.

Weights of the autoregressive decoder may be determined from the feature vectors of the plurality of frames extracted from the partial section of the first speech signal, according to the utterance characteristic of the speaker.

Weights of the autoregressive decoder may be determined by the sub-encoder, or by an encoder different from the sub-encoder, into which the feature vectors of the plurality of frames extracted from the partial section of the first speech signal are input.

The first speech signal may be selected at random as a speech signal having an utterance characteristic to be reproduced, selected from a database in which speech signals of a plurality of speakers are stored.

The first speech signal may be training data obtained from utterances of the text by the speaker, and the autoregressive decoder and the sub-encoder may be trained, wherein a loss between a feature vector of the first speech signal and the second feature vector is reduced in the training.

The autoregressive decoder and the sub-encoder may be trained using a discriminator configured to recognize the second feature vector as a feature vector generated from a real speech signal.

The discriminator may be configured for generative adversarial network (GAN) based training.

The text-to-speech method may further include determining, using a vocoder, the second speech signal in which the text is uttered, according to the utterance characteristic from the second feature vector.

The first speech signal may be training data obtained by uttering the text by the speaker, and the autoregressive decoder and the sub-encoder may be trained, wherein a loss between the first speech signal and the second speech signal is reduced by in training.

A hidden layer included in the autoregressive decoder may be configured to receive a resultant value of a hidden layer from a previous step.

The autoregressive decoder may further include an embedding encoder, wherein the embedding encoder is configured to receive output values of at least two previous steps preceding a current step, process the output values, and output the processed output values to an embedding layer included in the autoregressive decoder.

The second feature vector and the text may be used as training data for a speech recognition model.

The context information may be determined using an encoder and an attention model corresponding to the autoregressive decoder from the text input into the encoder.

The sub-encoder is implemented using a neural network or a processed principal component analysis (PCA).

The determining may further use either one or both of a long short-term memory (LSTM) nodes and/or structures and a self-attention based model.

In another general aspect, a non-transitory computer-readable storage medium stores instructions that, when executed by one or more processors, cause the one or more processors to perform the method described above.

In another general aspect, a text-to-speech apparatus includes a memory configured to store a sub-encoder and an autoregressive decoder, and one or more processors configured to determine, using the sub-encoder, a first feature vector indicating an utterance characteristic of a speaker from feature vectors of a plurality of frames extracted from a partial section of a first speech signal of the speaker, and determine, using the autoregressive decoder into which the first feature vector is input as an initial value, from context information of the text, a second feature vector of a second speech signal in which a text is uttered according to the utterance characteristic.

In another general aspect, a processor-implemented text-to-speech method includes determining, using a sub-encoder, a first feature vector indicating an utterance characteristic of a speaker from feature vectors of a plurality of frames extracted from a partial section of a first speech signal of the speaker, determining, using an autoregressive decoder, into which the first feature vector is input as an initial value, from context information of the text, a second feature vector of a second speech signal in which a text is uttered according to the utterance characteristic, and training the autoregressive decoder and the sub-encoder to reduce a loss between a feature vector of the first speech signal and the second feature vector, wherein the first speech signal is obtained from utterances of the text by the speaker, and the first speech signal is used as training data.

Other features and aspects will be apparent from the following detailed description, the drawings, and the claims.

Figure 1:
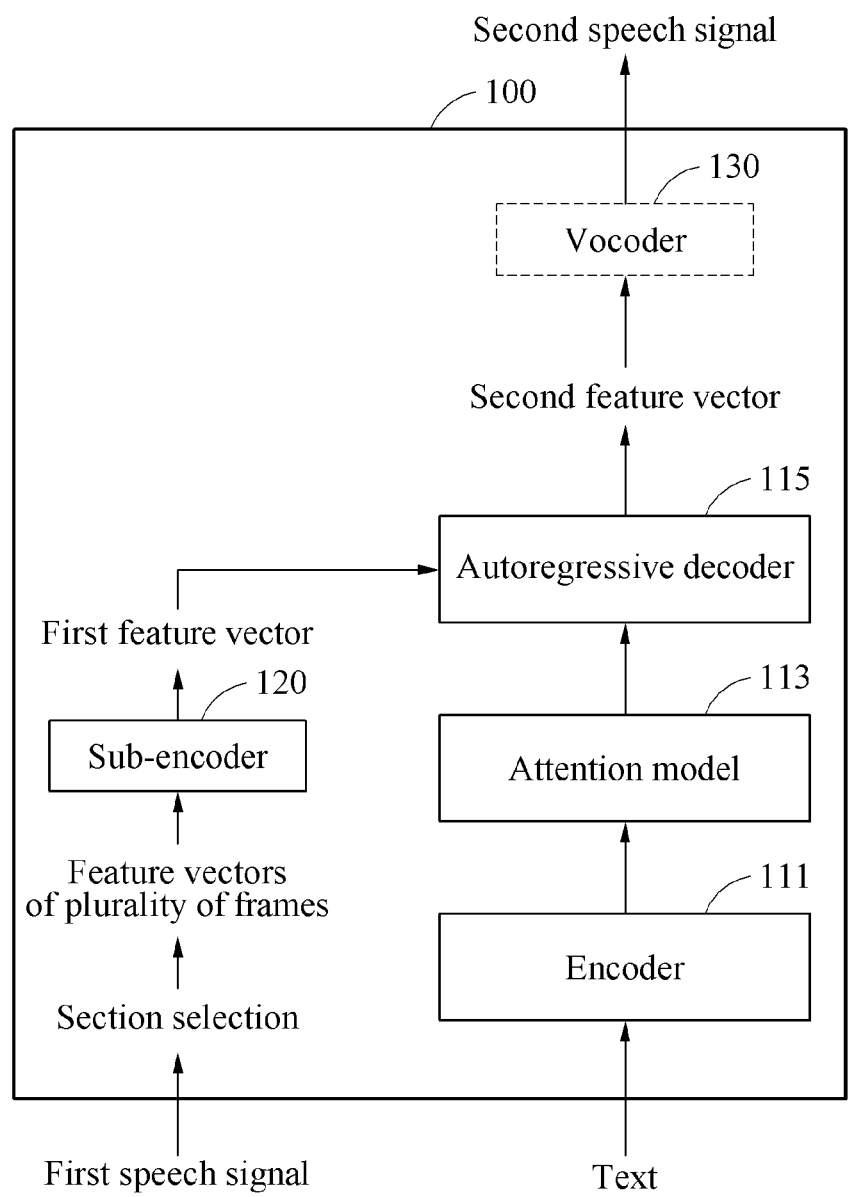
FIGS. 1 through 6 illustrate examples of a text-to-speech model.

Throughout the drawings and the detailed description, unless otherwise described or provided, the same drawing reference numerals are understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

It should be noted that if it is described that one component is "connected," "coupled," or "joined" to another component, a third component may be "connected," "coupled," and "joined" between the first and second components, although the first component may be directly connected, coupled, or joined to the second component.

Unless otherwise defined, all terms, including technical and scientific terms, used herein have the same meaning as commonly understood by one of ordinary skill in the art to which this disclosure pertains and in view of the disclosure of this application. Terms, such as those defined in commonly used dictionaries, are to be interpreted as having a meaning that is consistent with their meaning in the context of the relevant art and consistent with the disclosure of this application, and are not to be interpreted in an idealized or overly formal sense unless expressly so defined herein.

Hereinafter, examples are described in detail with reference to the accompanying drawings. The following specific structural or functional descriptions are exemplary to merely describe the examples, and the scope of the examples is not limited to the descriptions provided in the present specification. Various changes and modifications can be made thereto by those of ordinary skill in the art. Like reference numerals in the drawings denote like elements, and a known function or configuration will be omitted herein.

Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

FIGS. 1 through 6 illustrate examples of a text-to-speech model.

Referring to the example of FIG. 1, a text-to-speech model 100 may include an encoder 111, an attention model 113, an autoregressive decoder 115, and a sub-encoder 120. The text-to-speech model 100 may further include a vocoder 130. However, examples are not limited to these elements, and additional or alternate elements may be present.

The text-to-speech model 100 may convert an input text, such as a word, phrase, sentence, or paragraph, into a second speech signal or a second feature vector of the second speech signal. In this example, the second speech signal may be a speech signal in which a text is uttered according to an utterance characteristic, of a predetermined speaker, included in a first speech signal. That is, the text-to-speech model 100 may output the second speech signal in which the input text is uttered either according to the utterance characteristic, of the predetermined speaker and included in the first speech signal, or the second feature vector of the second speech signal.

The text-to-speech model 100 may be an encoder-decoder based neural network. For example, the neural network may include a plurality of layers, and each of the layers may include a plurality of nodes. Nodes of neighboring layers may be connected through weighted connections. Such weighted connections are of activations of a previous layer node provided through the connections to a subsequent layer node, for example, and where the connection is weighted or the corresponding weighting is applied by the subsequent layer node during its activation operation. Through the training, weights are assigned to the synapses, and thus parameters of the neural network include such resultant weights. Various types of training may be used, for example, such as gradient loss and/or descent or back-propagation.

The plurality of layers of the neural network may include an input layer, a hidden layer, and an output layer. For example, the input layer may receive an input to perform training or recognition and may transmit the input to the hidden layer. The output layer may generate an output of the neural network based on signals received from nodes of the hidden layer. The hidden layer may be an intermediate layer of nodes disposed between the input layer and the output layer. When training, a hidden layer acts as an intermediate stage that maps input values to output values in a particular way. Accordingly, the hidden layer may convert training data transmitted through the input layer or data to be recognized into particular outputs. However, neural networks are not limited to including only one hidden layer, and in other examples, multiple hidden layers may be used. Additionally, in various examples, various numbers of neurons may be used at each layer. Thus, the neural network includes an input layer, one or more hidden layers, and an output layer. The training process weights connections between nodes in the layers, based on inputs, in a training process, and when the training process is complete, input values fed through the neural network and the hidden layers provide output values at the nodes of the output layer that are in accordance with a desired mapping between inputs and outputs.

The encoder 111 may determine a feature vector of the text from the input text, and the attention model 113 may determine context information of the text from the feature vector of the input text. For example, the feature vector may also be referred to as a filter bank.

Further, the sub-encoder 120 may be a neural network that determines a first feature vector indicating an utterance characteristic of a speaker. Such an utterance characteristic is derived from feature vectors corresponding to a plurality of frames extracted from a partial section of the input first speech signal. The neural network of the sub-encoder 120 may have a size smaller than the neural network of the encoder 111. The section of the input first speech signal from which the plurality of frames is extracted is described in further detail with reference to the example of FIG. 3.

The autoregressive decoder 115 may determine the second feature vector of the second speech signal from the context information of the text, using the first feature vector as an initial value. In this example, the second speech signal may be a speech signal in which the text is uttered according to the utterance characteristic of the speaker.

In an example where the vocoder 130 is not included in the text-to-speech model 100, the text-to-speech model 100 may output the second feature vector. Conversely, in an example where the vocoder 130 is included in the text-to-speech model 100, the vocoder 130 may determine the second speech signal from the second feature vector, and the text-to-speech model 100 may output the second speech signal.

As described above, the text-to-speech model 100 may be a text-to-speech model or a text-to-feature vector including a sequence-to-sequence model.

The second feature vector or the second speech signal determined by the text-to-speech model 100 may be used as training data for a speech recognition model together with the text. For example, the second feature vector or the second speech signal may be supplied to the speech recognition model, and recognized by the speech recognition model to produce recognized text. During training, such recognized text is compared to the original training text to assess how to adjust the speech recognition model for less loss. In this way, it may be possible to easily obtain training data having various utterance characteristics.

Figure 2:
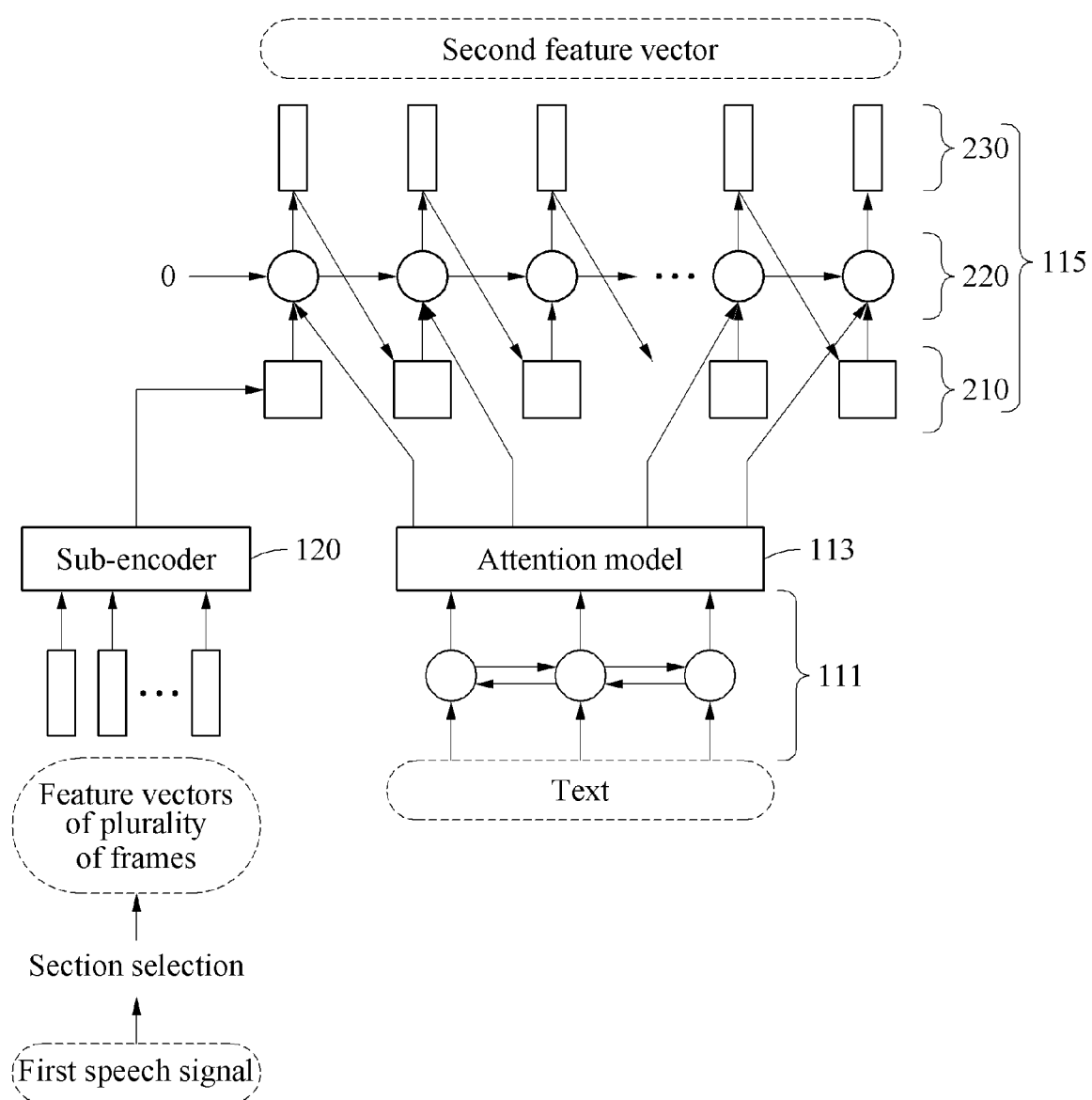

Referring to the example of FIG. 2, an example of a structure of the text-to-speech model 100 is illustrated.

The autoregressive decoder 115 may include an embedding layer 210, a hidden layer 220, and an output layer 230.

First, the sub-encoder 120 may obtain a first feature vector from feature vectors of a plurality of frames extracted from a partial section of a first speech signal. The autoregressive decoder 115 may receive the first feature vector obtained by the sub-encoder 120 as an autoregressive initial value of the embedding layer 210. The autoregressive decoder 115 may obtain a second speech signal in which a text is uttered according to an utterance characteristic of a speaker or a second feature vector of the second speech signal, by using the first feature vector indicating the utterance characteristic of the speaker as the autoregressive initial value of the embedding layer 210.

The embedding layer 210 may be a layer that receives an output value of a previous step and may output a value after linearly or non-linearly processing the received output value of the previous step. For example, the embedding layer 210 may transform, e.g. reduce, a dimension of the input feature vector and may output the dimension-transformed feature vector to the hidden layer 220. As described above, the autoregressive decoder 115 may be an autoregressive model that determines an output value of a current step by using the output value of the previous step. For ease of description, the current step may also be referred to as a current point in time, and the previous step may also be referred to as a previous point in time. In an example, the steps sequence may occur based on set clock cycle, for example.

The autoregressive decoder 115 may receive, through the hidden layer 220, context information obtained from the text using the encoder 111 and the attention model 113. A hidden layer 220 of a current step may receive an output value of an embedding layer 210 of the current step and a value of the hidden layer 220 of a previous step. The hidden layer 220 may subsequently output an output value to an output layer 230 of the current step. In this example, the value of the hidden layer 220 of the previous step received by the hidden layer 220 of the current step may be referred to as a recurrent value, and a recurrent initial value of the hidden layer 220 may be 0.

The autoregressive decoder 115 may be a neural network having recurrent connections therein. For example, the autoregressive decoder 115 may be a recurrent neural network (RNN) based model having a structure in which the value of the hidden layer 220 is input again into the hidden layer 220. For example, a value of the hidden layer 220 output in the previous step may be recurrently input into the hidden layer 220 again. Thus, the hidden layer 220 may receive the output value of the embedding layer 210 in the current step and the value of the hidden layer 220 in the previous step together. However, an example of the autoregressive decoder 115 may not be limited to such a particular example. For example, examples include using long short-term memory (LSTM) nodes or structures and a self-attention based model may be applicable as different aspects of the autoregressive decoder 115, as discussed above.

Figure 3:
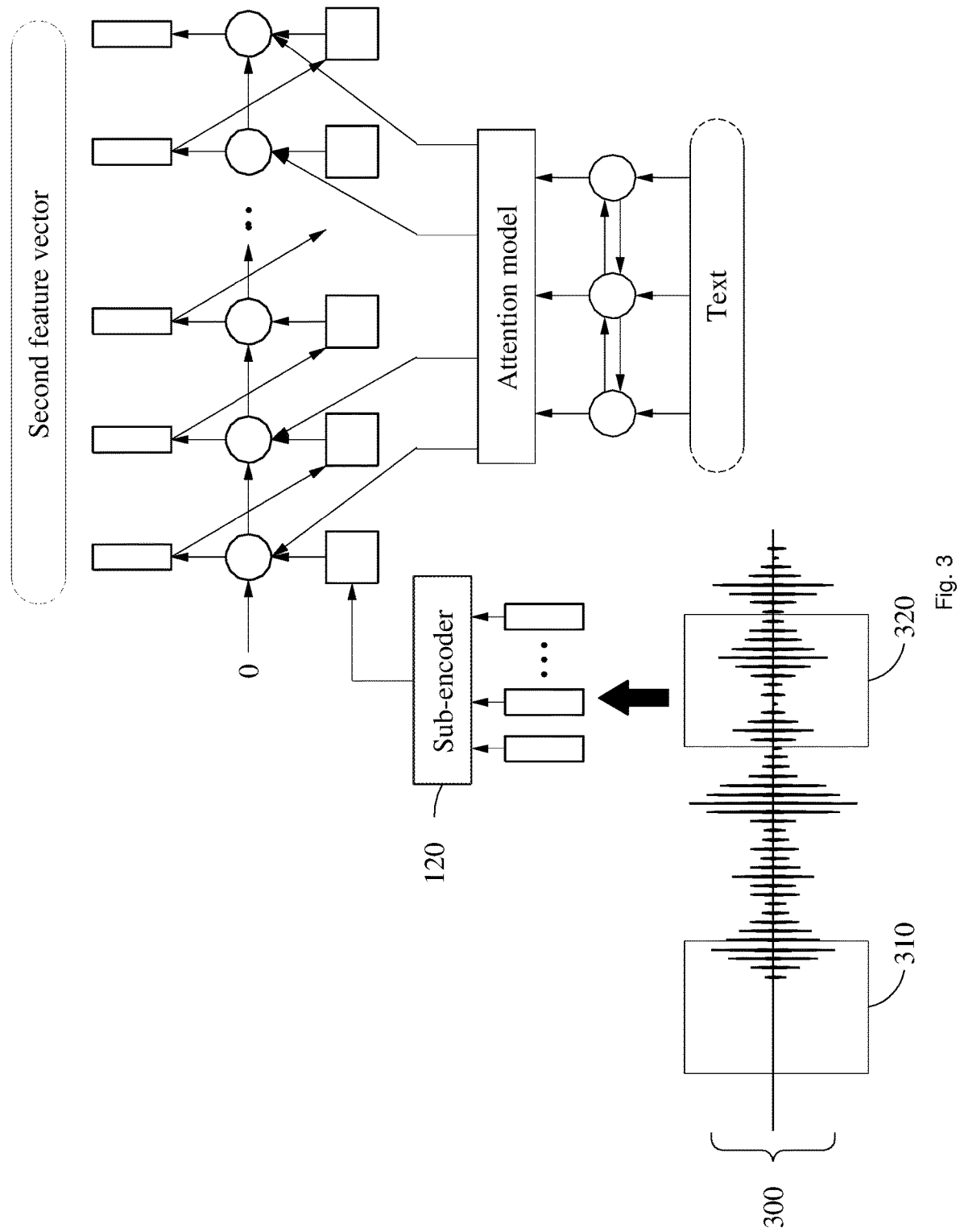

Referring to the example FIG. 3, an example to explain the sub-encoder 120 is illustrated.

The sub-encoder 120 may determine a first feature vector indicating an utterance characteristic of a speaker from a first speech signal 300 including a speech of the speaker. The sub-encoder 120 may determine the first feature vector from feature vectors of a plurality of frames. Such frames are extracted from a section of the first speech signal 300 in which the speech of the speaker exists. To determine the first feature vector indicating the utterance characteristic of the speaker, the section in which the speech of the speaker exists in the first speech signal 300 may be selected.

The sub-encoder 120 may determine the first feature vector from feature vectors of a plurality of frames extracted at random from a section after the middle of the first speech signal. For example, when a plurality of frames is extracted from a section 310 in which the speech of the speaker exists partially, a first feature vector determined based on feature vectors of the corresponding plurality of frames may not indicate the utterance characteristic of the speaker to a sufficient extent. Conversely, when a plurality of frames is extracted from a section 320 in which the speech of the speaker exists sufficiently, a first feature vector determined based on feature vectors of the corresponding plurality of frames may indicate the utterance characteristic of the speaker to a sufficient extent. Furthermore, when training the sub-encoder 120, better results may be achieved by determining the first feature vector by selecting one of remaining sections excluding an initial section in the first speech signal.

In another example, a speech classifier may be used to select a section in which the speech of the speaker exists in the first speech signal. For example, the speech classifier may be used to identify a speech section or a silence section in the first speech signal and extract a plurality of frames from the identified speech section, in order to help isolate a section whose recognition is more relevant, in that recognizing a silence section may not be a helpful use of recognition resources.

The plurality of frames may include two or more frames, for example, a number of frames from which the utterance characteristic of the speaker may be extracted sufficiently.

The sub-encoder 120 may determine the first feature vector by transforming a dimension of the feature vectors of the plurality of frames. The dimension-reduced first feature vector may be output from the sub-encoder 120 so as to be input into an embedding layer.

The sub-encoder 120 may be implemented as a neural network or a principal component analysis (PCA) procedure. Such a PCA procedure is a statistical procedure that uses an orthogonal transformation to convert the first feature vector into linearly uncorrelated variables called principal components.

Figure 4:
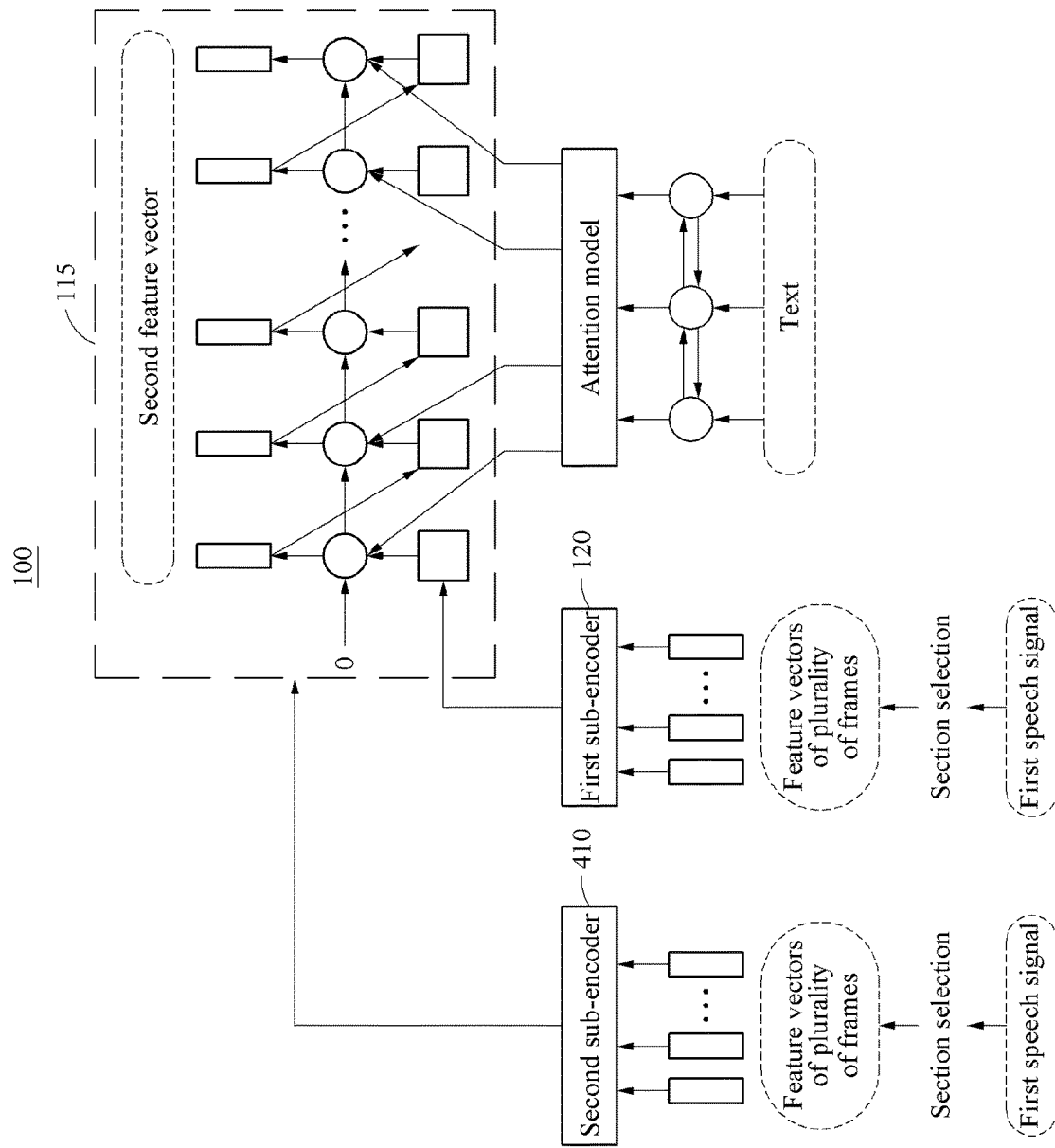

Referring to FIG. 4, an example of determining weights of the autoregressive decoder 115 is illustrated.

To effectively reflect the utterance characteristic of the speaker in the second speech signal determined by the text-to-speech model 100, weights of the autoregressive decoder 115 may be determined based on the utterance characteristic of the speaker. To this end, a second sub-encoder 410, different from the first sub-encoder 120, may be used. As described above with reference to the example of FIG. 3, the second sub-encoder 410 may also extract the plurality of frames from the section in which the speech of the speaker exists in the first speech signal, and may determine the weights of the autoregressive decoder 115 from the feature vectors of the extracted plurality of frames. FIG. 4 illustrates an example in which the first sub-encoder 120 and the second sub-encoder 410 may be provided separately. However, in some examples, the first sub-encoder 120 may determine the first feature vector and the weights of the autoregressive decoder 115 together, e.g., without using a separate first sub-encoder 120 and second sub-encoder 410.

Figure 5:
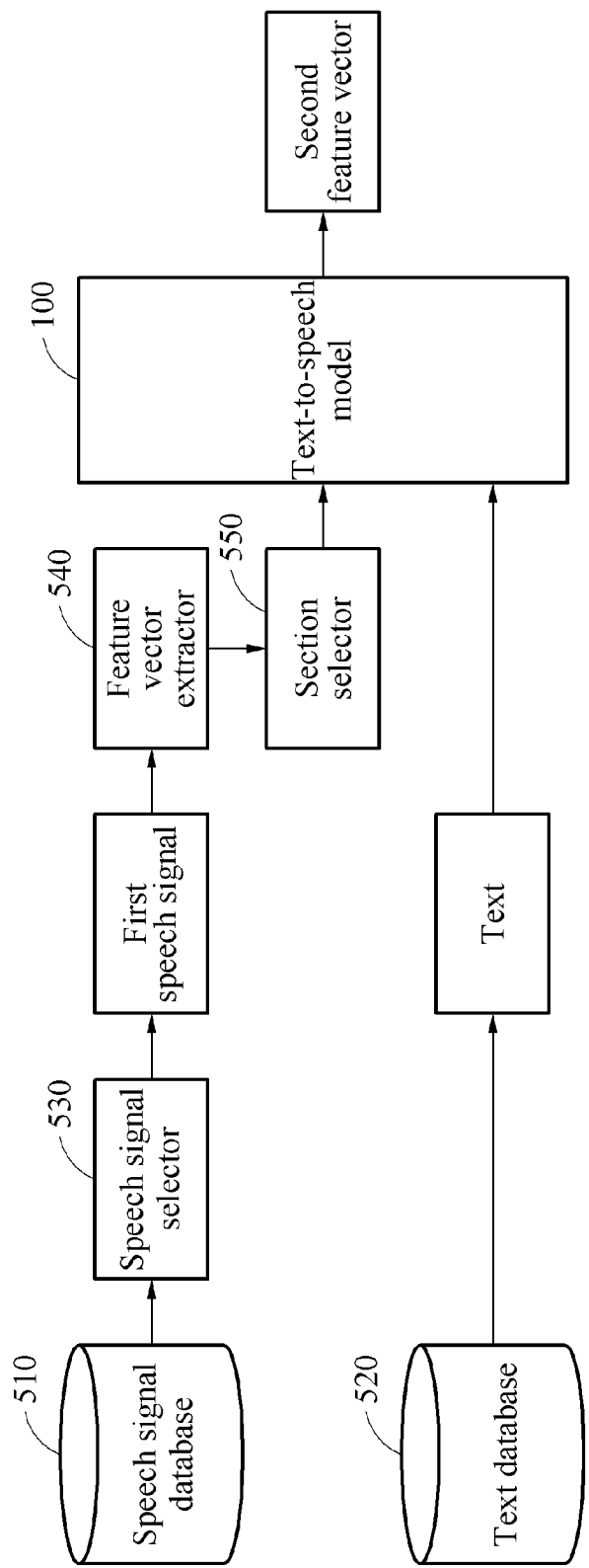

Referring to FIG. 5, a block diagram to describe a process of synthesizing a speech in a text-to-speech apparatus is illustrated.

A speech signal database 510 may store speech signals of a plurality of speakers, and a text database 520 may store a plurality of texts.

A speech signal selector 530 may select a speech signal having an utterance characteristic to be generated from the plurality of speech signals stored in the speech signal database 510. A feature vector extractor 540 may extract a feature vector of the selected speech signal, and a section selector 550 may select a section to determine a first feature vector indicating an utterance characteristic of a speaker in the extracted feature vector. Additionally, a text-to-speech apparatus may select a text desired to be uttered from the plurality of texts stored in the text database 520.

The text-to-speech apparatus may determine a second feature vector of a second speech signal in which a text is uttered according to the utterance characteristic of the speaker from the text, using the text-to-speech model 100 including an autoregressive decoder into which the first feature vector is input as an initial value.

Figure 6:
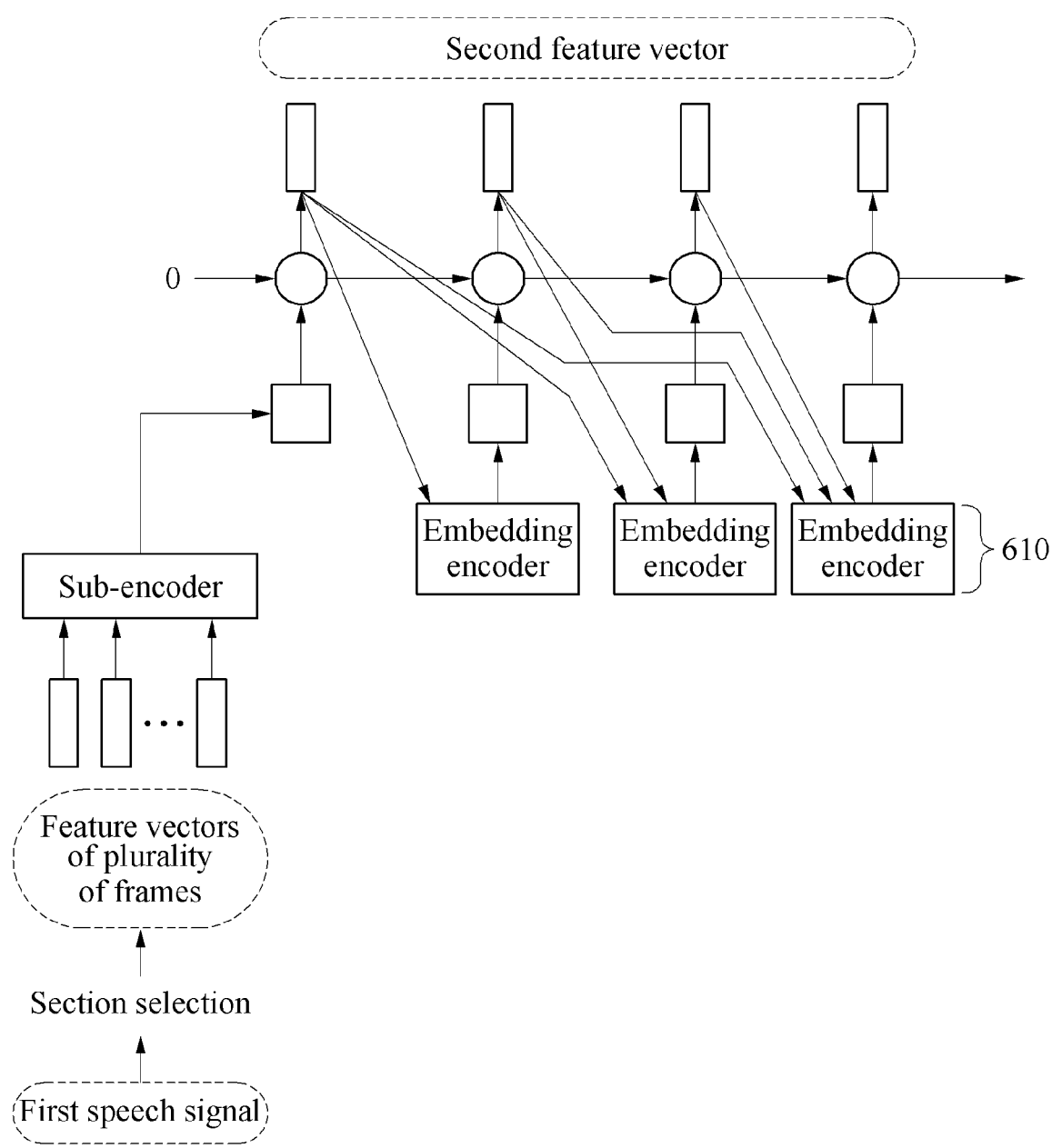

Referring to FIG. 6, an example of the text-to-speech model 100 is illustrated. The autoregressive decoder may further include an embedding encoder 610. The embedding encoder 610 may receive output values of at least two previous steps preceding a current step, process the received output values, and output the processed output values into an embedding layer. For example, the embedding encoder 610 may embed the received output values into a predetermined dimension. The encoder and the attention model included in the text-to-speech model 100 are omitted from FIG. 6, for brevity.

Figure 7:
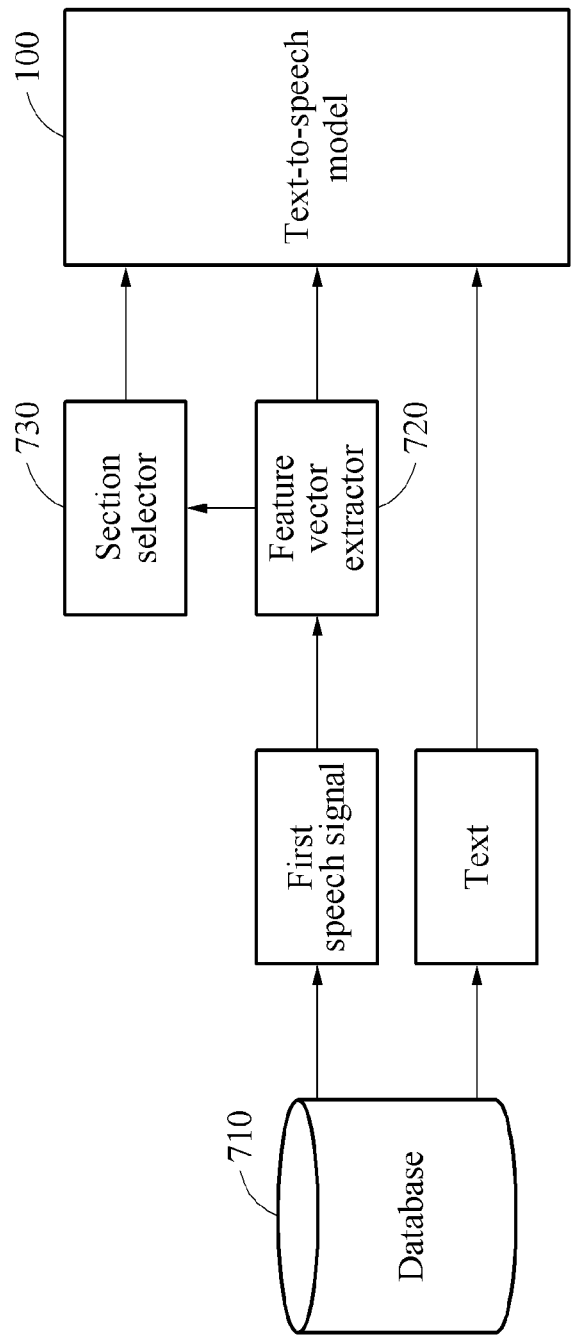
FIGS. 7 through 9 illustrate examples of training a text-to-speech model.
Figure 8:
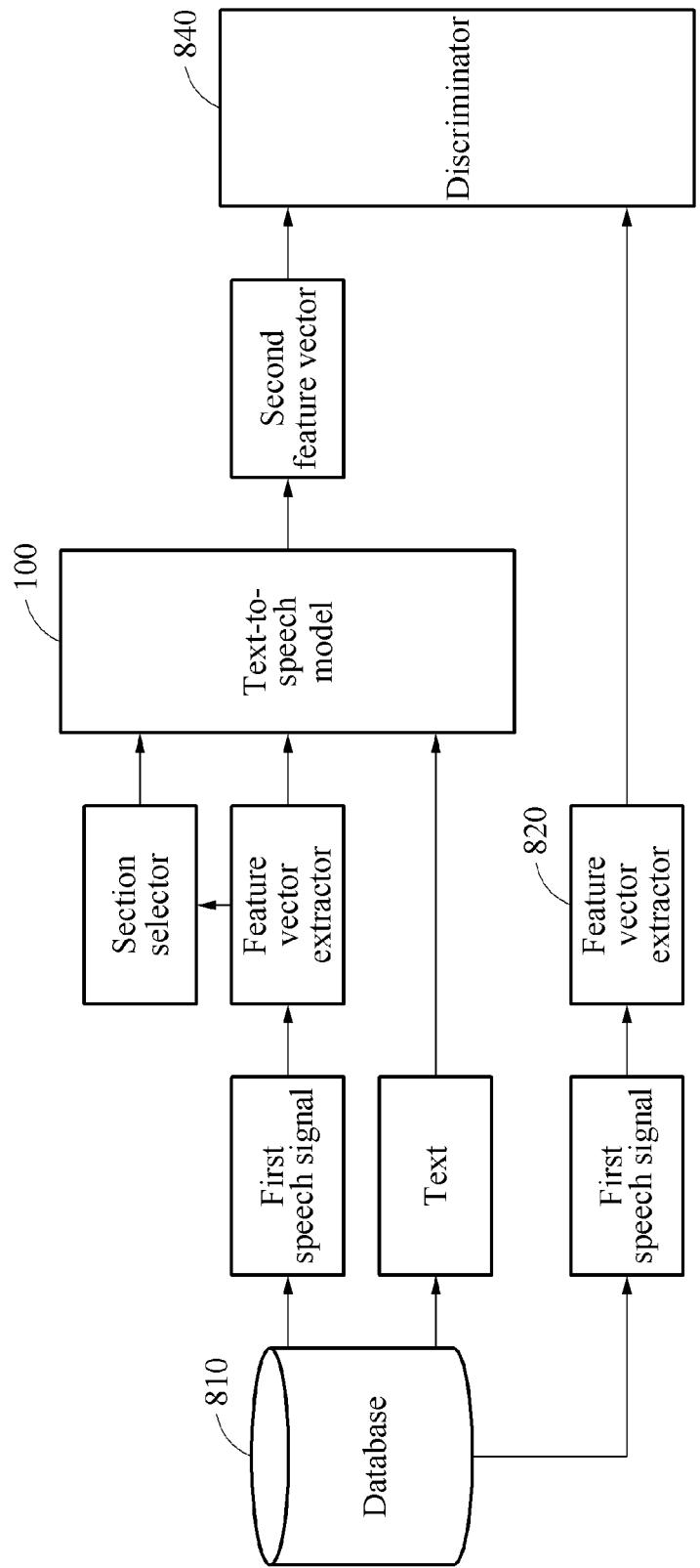
Figure 9:
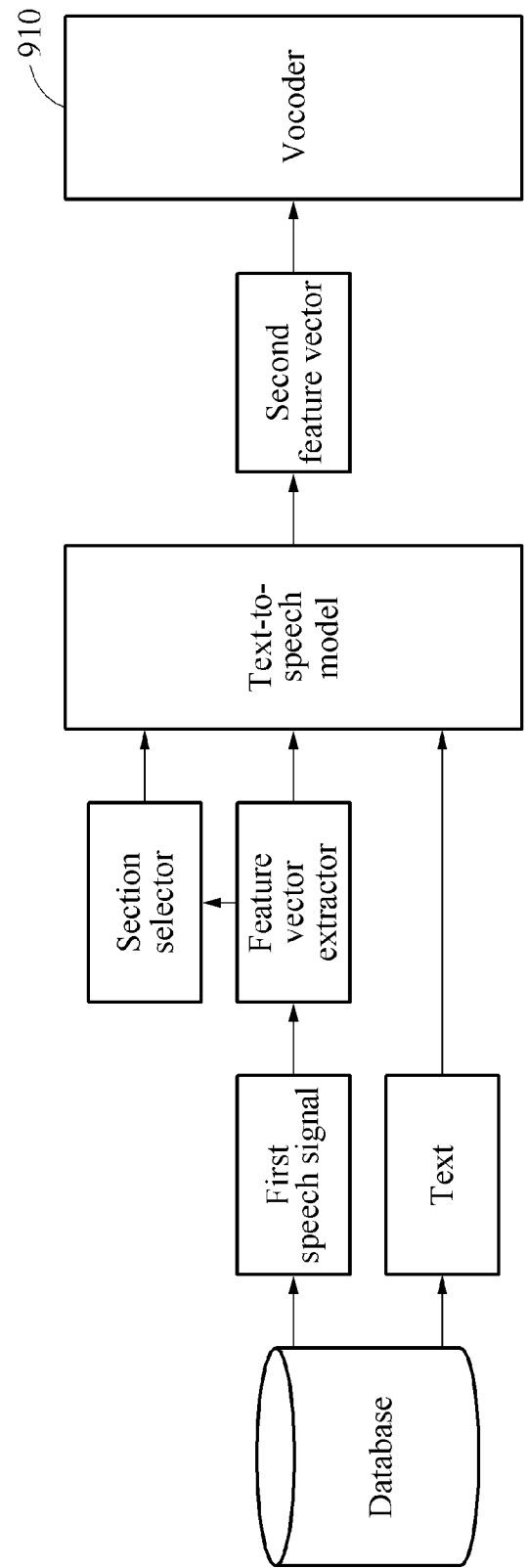

FIGS. 7 through 9 illustrate examples of training a text-to-speech model.

Referring to the example of FIG. 7, a block diagram to describe a process of training the text-to-speech model 100 is illustrated.

A database 710 may store training data including a speech signal and a text. The speech signal included in the training data may be a speech signal in which a corresponding text is uttered.

First, training data may be selected in the database 710. A feature vector extractor 720 may extract a feature vector of a first speech signal included in the selected training data. A section selector 730 may select a section to determine a first feature vector indicating an utterance characteristic of a speaker in the extracted feature vector.

A text-to-speech apparatus may determine, using the text-to-speech model 100, a second feature vector of a second speech signal derived from the first feature vector and a text included in the selected training data. The text-to-speech model 100 may be trained such that a loss between the second feature vector of the second speech signal and the feature vector of the first speech signal extracted by the feature vector extractor 720 may be reduced.

Referring to FIG. 8, a block diagram to describe a process of training the text-to-speech model 100 using a discriminator 840 is illustrated. The discriminator 840 may be configured for generative adversarial network (GAN) based training. Such discrimination by the discriminator 840 may use a model that discriminates an authentic feature vector between a second feature vector generated by the text-to-speech model 100 and a feature vector of a real first speech signal selected in a database 810. The text-to-speech model 100 may be trained such that the discriminator recognizes the second feature vector as the feature vector generated from the real first speech signal. Thus, the text-to-speech model 100 may generate a more realistic second speech signal or a second feature vector of the second speech signal.

Referring to FIG. 9, a block diagram to describe a process of training a text-to-speech model using a vocoder 910 is illustrated. The vocoder 910 may be a model that converts a second feature vector determined by the text-to-speech model into a second speech signal, and may include, for example, WaveNet, which is an example of a deep neural network for generating raw audio. However, WaveNet is only an example, and alternative vocoders may be used in other examples. The text-to-speech model may be trained such that a loss between the second speech signal determined by the vocoder 910 and a first speech signal selected in the database 810 may be reduced. The text-to-speech model may also be trained such that a sum of a loss between the second feature vector of the second speech signal and a feature vector of the first speech signal and the loss between the second speech signal and the first speech signal may be reduced.

Figure 10:
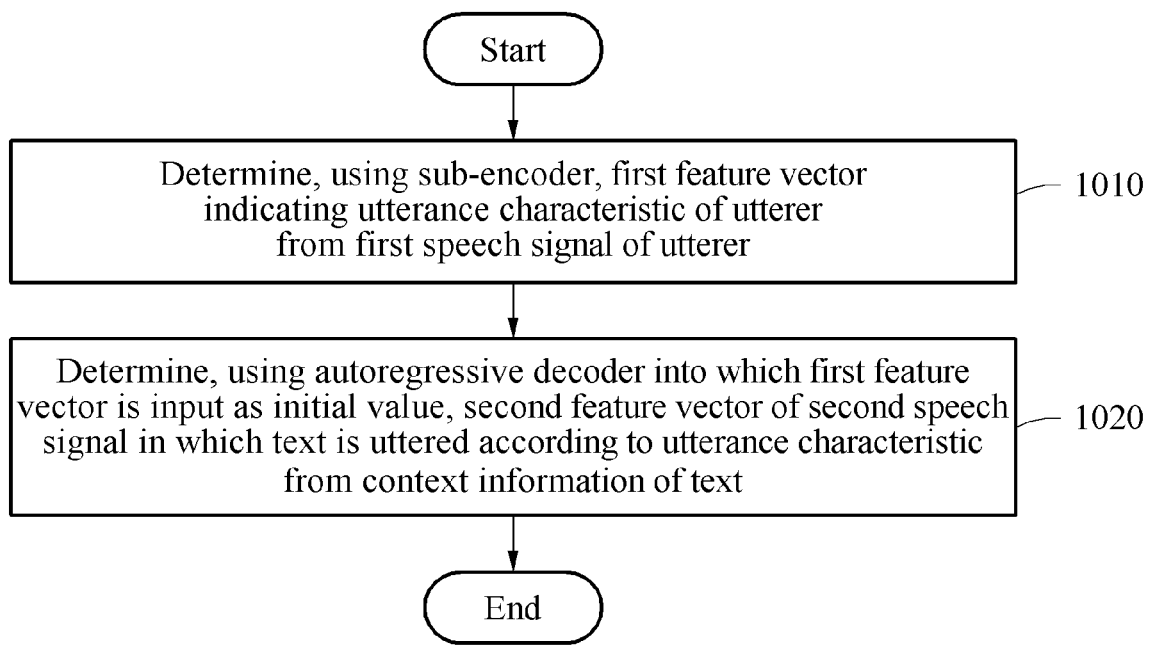
FIG. 10 illustrates an example of a text-to-speech method.

FIG. 10 illustrates an example of a text-to-speech method.

Referring to FIG. 10, a text-to-speech method performed by a processor included in a text-to-speech apparatus is illustrated.

In operation 1010, the text-to-speech apparatus may determine, using a sub-encoder, a first feature vector indicating an utterance characteristic of a speaker from feature vectors of a plurality of frames extracted from a partial section of a first speech signal of the speaker. The text-to-speech apparatus may determine the first feature vector from feature vectors of a plurality of frames extracted from a section in which a speech of the speaker exists in the first speech signal.

In operation 1020, the text-to-speech apparatus may determine, using an autoregressive decoder into which the first feature vector is input as an initial value, a second feature vector of a second speech signal in which a text is uttered according to the utterance characteristic from context information of the text. In this example, the first feature vector may be input as an autoregressive initial value of an embedding layer included in the autoregressive decoder. Further, a recurrent initial value of a hidden layer included in the autoregressive decoder may be 0. Weights of the autoregressive decoder may be determined from the feature vectors of the plurality of frames extracted from the partial section of the first speech signal according to the utterance characteristic of the speaker.

In a training process, the first speech signal may be training data obtained by uttering the text by the speaker, and the autoregressive decoder and the sub-encoder may be trained such that a loss between a feature vector of the first speech signal and the second feature vector may be reduced. Further, the autoregressive decoder and the sub-encoder may be trained such that a discriminator recognizes the second feature vector as a feature vector generated from a real speech signal.

The description provided with reference to FIGS. 1 through 9 applies to the operations of FIG. 10, and thus duplicated description is omitted, for brevity.

Figure 11:
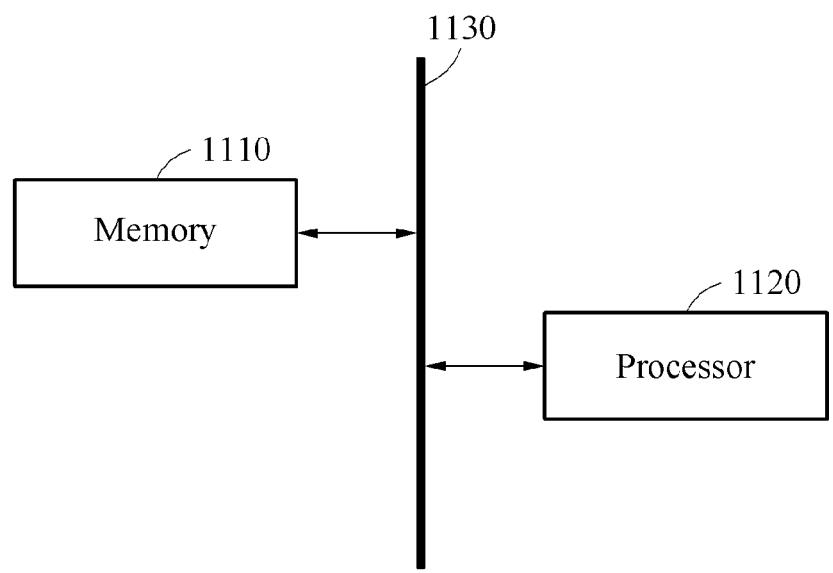
FIG. 11 illustrates an example of a text-to-speech apparatus.

FIG. 11 illustrates an example of a text-to-speech apparatus.

Referring to the example of FIG. 11, a text-to-speech apparatus 1100 may include a memory 1110 and a processor 1120. The memory 1110 and the processor 1120 may communicate with each other through a bus 1130.

The memory 1110 may include computer-readable instructions. The processor 1120 may perform the operations described above when the instructions stored in the memory 1110 are executed by the processor 1120. For example, the memory 1110 may be a volatile memory or a non-volatile memory, or a combination of volatile and non-volatile memory. The memory 1110 may include a text-to-speech model. The text-to-speech model may include an encoder 111, an attention model 113, an autoregressive decoder 115, and a sub-encoder 120. Furthermore, the text-to-speech model may further include a vocoder 130. The structure and operation of these elements are discussed further, above.

The processor 1120 may determine, using the sub-encoder, a first feature vector indicating an utterance characteristic of a speaker from feature vectors of a plurality of frames extracted from a partial section of a first speech signal of the speaker. The processor 1120 may determine, using the autoregressive decoder into which the first feature vector is input as an initial value, a second feature vector of a second speech signal, in which a text is uttered according to the utterance characteristic, from context information of the text.

For example, the text and the second feature vector determined by the processor 1120 may be used as training data for a speech recognition model. In addition, the text-to-speech apparatus 1100 may perform the operations described above.

The text-to-speech model 100, encoder 111, attention model 113, autoregressive decoder 115, sub-encoder 120, vocoder 130, speech signal database 510, text database 520, speech signal selector 530, feature vector extractor 540, section selector 550, database 710, feature vector extractor 720, section selector 730, database 810, feature vector extractor 820, discriminator 840, vocoder 910, text-to-speech apparatus 1100, memory 1110, processor 1120, and bus 1130, and other apparatuses, modules, devices, and other components, such as in FIGS. 1-11 are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processor or computers so that the one or more processors or computers can execute the instructions. In one example, the instructions or software and any associated data, data files, and data structures are distributed over network-coupled computer systems so that the instructions and software and any associated data, data files and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented text-to-speech method, comprising:
    determining, using a sub-encoder, a first feature vector indicating an utterance characteristic of a speaker from feature vectors of a plurality of frames extracted at random from a partial section of a first speech signal of the speaker, in which speech of the speaker exists, after a midpoint of the first speech signal;
    determining, using an autoregressive decoder, into which the first feature vector is input as an initial value, from context information of a text, a second feature vector of a second speech signal in which the text is uttered according to the utterance characteristic; and
    generating a synthesized speech signal based on the second feature vector.

2. The text-to-speech method of claim 1, wherein the determining of the first feature vector comprises determining the first feature vector by transforming a dimension of the feature vectors of the plurality of frames extracted from the section of the first speech signal.

3. The text-to-speech method of claim 1, wherein the first feature vector is input as an autoregressive initial value of an embedding layer included in the autoregressive decoder.

4. The text-to-speech method of claim 3, wherein the first feature vector is input as an initial value of the embedding layer, and an output value of a previous operation of the embedding layer is input again into the embedding layer.

5. The text-to-speech method of claim 1, wherein a recurrent initial value of a hidden layer included in the autoregressive decoder is 0.

6. The text-to-speech method of claim 1, wherein weights of the autoregressive decoder are determined from the feature vectors of the plurality of frames extracted from the partial section of the first speech signal, according to the utterance characteristic of the speaker.

7. The text-to-speech method of claim 6, wherein the weights of the autoregressive decoder are determined by the sub-encoder, or by an encoder different from the sub-encoder, into which the feature vectors of the plurality of frames extracted from the partial section of the first speech signal are input.

8. The text-to-speech method of claim 1, wherein the first speech signal is selected at random as a speech signal having an utterance characteristic to be reproduced, selected from a database in which speech signals of a plurality of speakers are stored.

9. The text-to-speech method of claim 1, wherein the first speech signal is training data obtained from utterances of the text by the speaker, and
    the autoregressive decoder and the sub-encoder are trained, wherein a loss between a feature vector of the first speech signal and the second feature vector is reduced in the training.

10. The text-to-speech method of claim 1, wherein the autoregressive decoder and the sub-encoder are trained using a discriminator configured to recognize the second feature vector as a feature vector generated from a real speech signal.

11. The text-to-speech method of claim 10, wherein the discriminator is configured for generative adversarial network (GAN) based training.

12. The text-to-speech method of claim 1, further comprising:
    determining, using a vocoder, the second speech signal in which the text is uttered, according to the utterance characteristic from the second feature vector.

13. The text-to-speech method of claim 12, wherein the first speech signal is training data obtained by uttering the text by the speaker, and
    the autoregressive decoder and the sub-encoder are trained, wherein a loss between the first speech signal and the second speech signal is reduced in the training.

14. The text-to-speech method of claim 1, wherein a hidden layer included in the autoregressive decoder is configured to receive a resultant value of a hidden layer from a previous step.

15. The text-to-speech method of claim 1, wherein the autoregressive decoder further comprises an embedding encoder,
    wherein the embedding encoder is configured to receive output values of at least one previous step preceding a current step, process the output values, and output the processed output values to an embedding layer included in the autoregressive decoder.

16. The text-to-speech method of claim 1, wherein the second feature vector and the text are used as training data for a speech recognition model.

17. The text-to-speech method of claim 1, wherein the context information is determined using an encoder and an attention model corresponding to the autoregressive decoder from the text input into the encoder.

18. The text-to-speech method of claim 1, wherein the sub-encoder is implemented using a neural network or a processed principal component analysis (PCA).

19. The text-to-speech method of claim 1, wherein the determining uses either one or both of a long short-term memory (LSTM) nodes and/or structures and a self-attention based model.

20. A non-transitory computer-readable storage medium storing instructions that, when executed by one or more processors, cause the one or more processors to perform the text-to-speech method of claim 1.

21. A text-to-speech apparatus, comprising:
    a memory configured to store a sub-encoder and an autoregressive decoder; and
    one or more processors configured to
    determine, using the sub-encoder, a first feature vector indicating an utterance characteristic of a speaker from feature vectors of a plurality of frames extracted at random from a partial section of a first speech signal of the speaker, in which speech of the speaker exists, after a midpoint of the first speech signal, determine, using the autoregressive decoder into which the first feature vector is input as an initial value, from context information of a text, a second feature vector of a second speech signal in which the text is uttered according to the utterance characteristic, and generate a synthesized speech signal based on the second feature vector.

22. A processor-implemented text-to-speech method, comprising:

determining, using a sub-encoder, a first feature vector indicating an utterance characteristic of a speaker from feature vectors of a plurality of frames extracted at random from a partial section of a first speech signal of the speaker, in which speech of the speaker exists, after a midpoint of the first speech signal;

determining, using an autoregressive decoder, into which the first feature vector is input as an initial value, from context information of a text, a second feature vector of a second speech signal in which the text is uttered according to the utterance characteristic; and training the autoregressive decoder and the sub-encoder to reduce a loss between a feature vector of the first speech signal and the second feature vector, wherein the first speech signal is obtained from utterances of the text by the speaker, and the first speech signal is used as training data.

* * * * *